July 17, 1962

W. STERN 3,044,341

DRILLING, REAMING AND TAPPING SCREW

Filed Sept. 16, 1959

INVENTOR.
William Stern
BY
Olson & Trexler
atty's

United States Patent Office 3,044,341
Patented July 17, 1962

3,044,341
DRILLING, REAMING AND TAPPING SCREW
William Stern, Park Ridge, Ill., assignor to Illinois Tool
Works Inc., a corporation of Delaware
Filed Sept. 16, 1959, Ser. No. 840,451
7 Claims. (Cl. 85—47)

The invention relates in general to screws, and more particularly relates to drilling, reaming and tapping screws.

Certain previously suggested thread-cutting screws have met with wide commercial acceptance due to the functionally excellent job they do in self-tapping a suitable pilot hole. In general such screws have required a pre-drilled hole provided by a separate operation.

Drill point thread-cutting screws have also been suggested heretofore and while in certain installations such screws may do an adequate job of drilling a pilot hole they may not do an equally adequate job of reaming and thread-cutting, and they frequently require techniques in manufacturing that result in unduly high costs.

It is an object of this invention to provide a screw which is constructed so as to obtain excellent thread-cutting and reaming functions and also an excellent pilot hole drilling function.

More specifically, it is an object of this invention to afford a screw of the aforementioned characteristics which self-drills by a modified trepanning cutting action.

It is a further object of this invention to provide a screw of the aforementioned characteristics adapted to be applied to a smooth surfaced workpiece without requiring a pilot hole or punched aperture, etc., in the workpiece.

It is a further object of this invention to provide a device as aforedescribed which is adapted to be applied to a workpiece by a power screw driver or a similar apparatus.

It is a further object of this invention to provide a screw device which is well adapted to mass manufacturing techniques, may be manufactured at a relatively low cost and which will otherwise serve its intended purposes.

The novel features that I consider characteristic of my invention are set forth with particularity in the appended claims. The invention itself, however, both as to its organization and its mode of operation, together with additional objects and advantages thereof, will best be understood by the following description of specific embodiments when read in connection with the accompanying drawings, in which:

Figure 1:
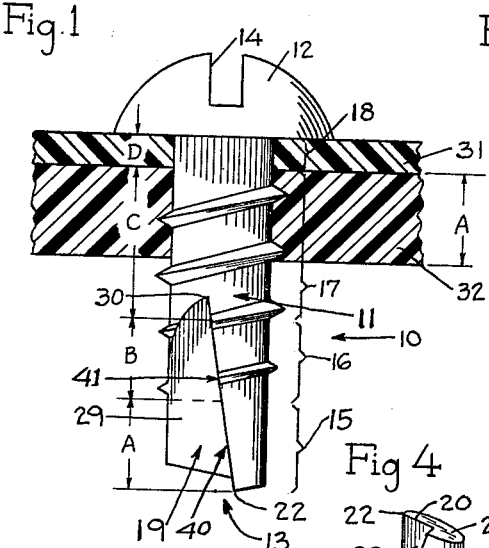
FIG. 1 is a vertical elevational view partially in section of a preferred embodiment of my invention in assembled relation to a pair of workpieces.
Figure 5:
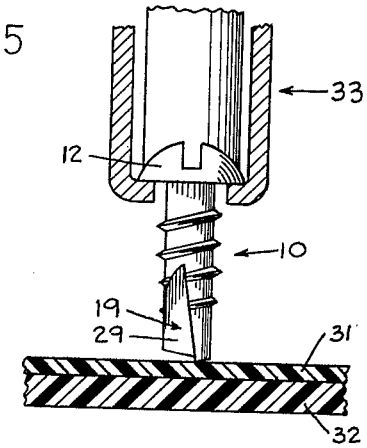
FIG. 5 is a front elevational view of the screw shown in FIGS. 1 to 3 when held in the jaws of a power screw driver prior to application of the screw to the workpieces.

Returning now to FIG. 1 of the drawings, a drilling, reaming and thread-cutting screw 10 is shown in assembled relationship to a pair of workpieces 31 and 32. The screw 10, as shown, is formed with a generally cylindrical shank 11 which is substantially uniform throughout its axial extent and is formed with a head 12 oppositely disposed to an entering end 13. The shank of screw 10 could be tapered at its entering end if desired. The head 12 may be any of a number of conventional configurations and may have a kerf 14 as shown. It is to be noted that the showing of the type of head is to be considered semi-diagrammatic rather than limiting, the major consideration being that the screw is adapted to be held at the head by the jaws 33 of suitable power screw driving equipment.

The shank 11 may be divided into four discrete sections along the axial length thereof. More particularly, the shank is formed with a peripherally smooth first axial portion 15 adjacent the entering end 13 which, as shown, is substantially the same diameter as the root diameter of the spaced threads of the screw. The axial dimension of the first axial portion is preferably not less than the thickness dimension (A) of the workpiece 32. Adjacent and trailing the first axial portion 15 is a second or thread-cutting portion 16. While the thread-cutting portion 16 and the threaded portion 17 are shown with spaced threads, it is to be expressly noted that the invention applies with equal facility to machine threads and other commercially known types of threads.

Figures 7, 8:
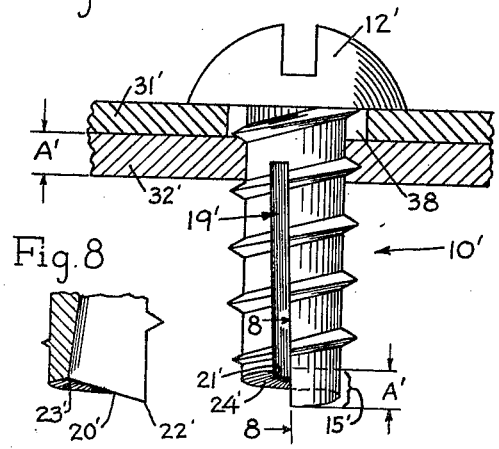
FIG. 7 is a view similar to FIG. 1 showing a modified form of my invention in assembled relation to a pair of workpieces.
FIG. 8 is a fragmentary sectional view along lines 8—8 of FIG. 7.

The next or third axial portion 17, is the threaded portion of the screw, and in the form shown, extends up to, but just short of, the top of the shank and is preferably of an axial length greater than the first axial portion 15. The fourth axial portion 18 adjacent the head is also adjacent the third axial portion and is preferably formed without any threads. Again, this configuration is to be considered semi-diagrammatic rather than limiting as it is apparent that when a pilot hole is used in the upper workpiece (as shown in FIG. 7) it is not necessary to leave the section 18 unthreaded.

Figures 2, 3:
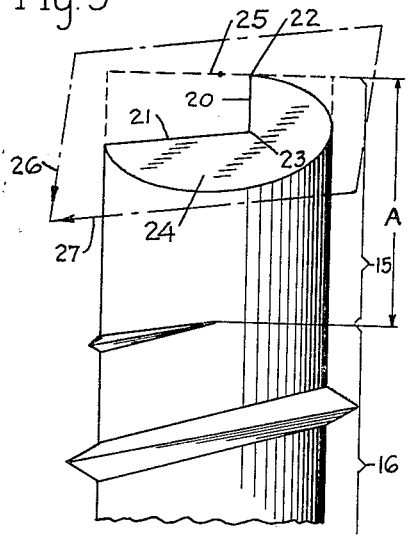
FIG. 2 is an end view of the screw shown in FIG. 1.
FIG. 3 is an enlarged fragmentary elevational view of the end portion of the screw shown in FIG. 1, the view being taken after the screw shown in FIG. 1 has been inverted.

A triangular slot 19 being a right triangular slot at the point of juncture with the entering end 13 as shown in end view FIGURE 2, having angularly disposed side walls 28 and 29 is formed in the entering end 13 of the shank 11 and extends upwardly along the shank so as to include the first, second and a portion of the third axial sections 15 through 17 respectively, said slot 19 terminating at point 30. The slot 19 as it traverses the entering end 13 defines an end cutting edge 20 and an edge 21 which juncture at point 23 which is in the second quadrant as viewed in FIG. 2. It is to be noted that the slot 19 includes more than 25% of the end surface of the shank so as to include the central axis of the shank within the confines thereof so that the length of the cutting edge 20 is greater than the radius of the shank. It is to be expressly noted that the side wall 28 at the cutting edge 20, extends in a plane perpendicular to the horizontal transverse axis of the shank and defines an included angle of less than 90° with a plane tangential to point 22 on the cutting edge. Under no circumstances may this included angle be more than 90°.

The cutting edge 20 is so configured that the furthest axial extent thereof is at point 22 which is in on the outer perimeter of the entering end where it joins the first axial section 15. The cutting edge 20 progressively decreases in axial dimension to point 23 which is the lowest point in axial dimension of said cutting edge 20. It will be further noted, particularly as shown in FIG. 3, that the entire cutting edge 20 extends axially a dimension greater than any portion of the trailing edge 21.

To define a cutting edge of the aforementioned characteristics the entering end 13 may be formed with a planar or flat surface 24 by removal of a portion of the stock at the end of the shank, the portion removed being shown semi-diagrammatically by dotted lines 25 in FIG. 3 of the drawings. To assure the double function of providing back-up strength for the cutting edge 20 and locating the trailing edge 21 below the cutting edge to provide relief (as viewed in FIG. 3), the planar end surface 24 may be conveniently formed by removing the end surface at a compound angle as shown semi-diagrammatically by the dot-dash parallelogram in FIG. 3 of the drawings. More particularly, the end surface stock may be removed by a suitable cutting tool by forming planar surface 24 inclined in at least two directions relative to a plane perpendicular to the central axis of the shank, i.e. as shown by the directions of arrows 26 and 27 of the parallelogram.

It has been found that for drilling in softer materials, such as plastics and the like, that it is preferable to have the declination of extreme points 22 and 23 on the cutting edge 20 be at an angle in the area of 25° from a plane perpendicular to the axis of the shank. On the other hand, for drilling into harder materials such as sheet metal, it is found preferable to have the declination of the angle be a lesser amount, i.e. in the neighborhood of 10° declination between points 22 and 23 from a plane perpendicular to the axis of the shank. The amount of declination along the trailing edge from a plane perpendicular to the axis of the shank, as shown semi-diagrammatically by the direction of arrow 27, may be varied as per the materials of application, the greater the declination the more backup stock being provided immediately behind the cutting edge 20 to provide strength for the cutting edge. It is preferred that this latter declination be at least 2°.

Figures 4, 6:
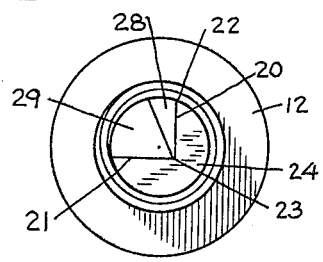
FIG. 4 is a fragmentary view similar to FIG. 3 after counter clockwise rotation of the screw 90° on the central axis of the screw.
FIG. 6 is a top view of the workpiece of application with a semi-diagrammatic showing of the engagement of the cutting edge of the screw upon said workpiece.

In operation, the screw 10 is firmly held in axial alignment by the jaws of a power screw driver 33 to prevent axial misalignment (sometimes referred to as wobble) of the screw shank 11. This is particularly important as the workpieces 31 and 32 are not punctured with a pilot hole in workpiece 31. As the jaws of the power screw driver 33 rotate the shank 11, the point 22 impinges on the workpiece 31 at point 34 and starts to cut a pilot hole 36. As the screw is fed to the workpiece by the driver 33, progressively greater portions of the surface within the confines of an area defined by circle 36 are engaged by the cutting edge 20, this being shown semi-diagrammatically by the Archimedean spiral in FIG. 6. When the center 35 of the hole 36 is engaged by the cutting edge 20, the entire cutting edge is in engagement with the upper workpiece. The screw is then progressively fed and proceeds to bore a hole through both workpieces, the cutting section being from outside to inside or a modified trepanning type of cutting action. It will be noted that the wall 28 of the slot 19 intersects the peripheral surface of the shank sections 15—16 to provide a side cutting edge having a reaming portion 40 and a thread-cutting portion 41. The wall 28 and thus the side cutting edge are inclined from the end cutting edge 20 forwardly with respect to the forward direction of rotation of the screw for enhancing the reaming and subsequent thread-cutting function. The size and configuration of the slot 19 affords easy removal of the chips generated by the cutting edge 20 during the boring operation.

After the first axial portion 15 of the shank has penetrated the thickness of the second workpiece 32, the thread-cutting action of the cutting edge 41 takes place. Thereafter, the screw 10 firmly fastens the two workpieces into the assembled relation shown in FIG. 1.

A modified form of the invention is shown in FIGS. 7 and 8 of the drawings and similar reference numerals primed have been used to identify similar parts. The screw shown in FIGS. 7 and 8 is substantially similar in concept with a similar type of trepanning cutting action but with a modified thread-cutting structure. The two major distinctions of the second embodiment relate to the rectangular slot 19' and the end surface 24'.

The slot of this embodiment may readily be formed by means of a simple sawing operation and in certain instances has an advantage of requiring only a minimum amount of stock material to be removed from the screw shank. It will be noted that the slot 19' provided with a configuration such that the cutting edge 20' extends into the interior of the slot 19' and has a greater dimension than the radius of the shank, and the center axis of the shank is included with the confines of the slot 19'.

The cutting edge 20' in the second embodiment again progresses inwardly from point 22' to point 23' so as to present a similar cutting edge to that shown in FIGS. 1 to 6 of the drawings. The end surface 24' of the shank is of a different configuration and may be generated by moving a cutting tool which is disposed at an inclined angle to the end surface of the shank while rotating the screw shank relative to the cutting wheel to provide a generally helical end surface as illustrated in FIGS. 7 and 8. In operation, the screw 10' operates substantially similar to screw 10.

Another distinction, as shown in FIG. 7 of the drawings, and as aforementioned, is that the top thread at axial portion 18 has been retained inasmuch as the workpiece 31' has been provided with a pilot hole 38 as previously discussed.

It will again be noted that the axial dimension (A') of first axial unthreaded portion 15' of the shank 11' is preferably at least as great as the dimension (A') of workpiece 32', as has been explained relative to the first embodiment. It is important in straight cylindrical shanks that the dimension (A) and (A') of portions 15–15' of the shank be at least as great as the thickness of the lower workpiece 32—32' since the thread-cutting portions of the shank feed into the material of its workpiece at a different rate than the feed necessary for the cutting action of the cutting edge 20.

Although certain specific embodiments of the invention have been shown and described, it is with full awareness that many modifications thereof are possible. Therefore, the invention is not to be restricted except insofar as is necessitated by the prior art and by the spirit of the appended claims.

What is claimed as the invention is:

1. A trepanning and thread-cutting screw for application by power driver means fixedly holding said screw on its axis for rotative movement normal to a workpiece comprising an elongated shank having a head portion and an oppositely disposed entering end portion, said shank being formed with a first axial unthreaded portion adjacent said entering end portion, a thread-cutting second axial portion adjacent said first portion and a threaded third axial portion adjacent said second portion, said shank being characterized by a slot formed in said entering end extending from a radial periphery thereof to a depth including a center axis of said shank to expose a cutting and a trailing edge at said entering end, the side walls of said slot extending in a substantially axial direction to include said first and second portions and a portion of said third axial portion, said cutting edge on the entering end being further characterized by a configuration such that said cutting edge extends generally radially inwardly a dimension greater than a radius of said shank and the furthest axial extent thereof from said head portion is disposed on the outer periphery of said first axial portion, said entire cutting edge extending axially from said head portion a greater distance than said trailing edge.

2. The screw set forth in claim 1 wherein said cutting edge defines a substantially straight line.

3. The screw set forth in claim 2 wherein said cutting edge progressively and uniformly decreases in axial dimension from said head portion along said shank.

4. The screw set forth in claim 1 wherein said entering end portion is a substantially planar surface.

5. The screw set forth in claim 4 wherein said planar entering end portion is defined by a plane inclined at an angle to a plane perpendicular to the center axis of said shank.

6. The screw set forth in claim 5 wherein said inclination of the planar entering end portion is further defined as a plane being inclined at two angles as measured respectively in at least two directions at right angles to each other when measured relative to a second plane perpendicular to the axis of said shank.

7. A trepanning type drilling, reaming and thread-cutting screw for application to a workpiece of predetermined thickness comprising an elongated shank substantially cylindrical throughout its length having a head portion and an oppositely disposed entering end portion, said shank being formed with a substantially peripherally smooth first axial portion adjacent said entering end portion having an axial length at least as great as the thickness of said workpiece, a thread-cutting second axial portion adjacent said first portion and a threaded third axial portion adjacent said second portion and having an axial length at least as great as said first portion, said shank being characterized by a slot formed in said entering end extending from a radial periphery thereof to a depth so as to traverse a center axis of said shank to expose a cutting and a trailing edge at said entering end, the side walls of said slot extending in a substantially axial direction to include said first, second portions and a portion of said third axial portion, said cutting edge on the entering end being further characterized by a configuration such that the furthest axial extent thereof from said head portion is disposed on the outer periphery of said first axial portion, said cutting edge progressively decreasing in axial dimension from said head portion and said entire cutting edge extending axially from said head portion a greater distance than said trailing edge.

References Cited in the file of this patent

UNITED STATES PATENTS

| | | |
|---|---|---|
| 2,255,997 | Hanneman | Sept. 16, 1941 |
| 2,654,284 | Schevenell | Oct. 6, 1953 |

FOREIGN PATENTS

| | | |
|---|---|---|
| 379,984 | Italy | Apr. 15, 1940 |
| 138,216 | Australia | Aug. 7, 1950 |